US012735661B2

(12) United States Patent
Xu et al.

(10) Patent No.: US 12,735,661 B2
(45) Date of Patent: Sep. 15, 2026

(54) METHOD OF MAKING DETERGENT GRANULES COMPRISING AN ALKYL SULFATE, AMPHOTERIC SURFACTANT, AND INORGANIC SALT MIXTURE

(71) Applicant: The Procter & Gamble Company, Cincinnati, OH (US)

(72) Inventors: Dan Xu, Beijing (CN); Yue Zhao, Beijing (CN); Xiaobin Chu, Beijing (CN); Nicholas Anthony Wilson, Morpeth (GB); Nicholas Alexander Jesse Mcguckin, Newcastle upon Tyne (GB)

(73) Assignee: The Procter & Gamble Company, Cincinnati, OH (US)

(*) Notice: Subject to any disclaimer, the term of this patent is extended or adjusted under 35 U.S.C. 154(b) by 446 days.

(21) Appl. No.: 18/497,168

(22) Filed: Oct. 30, 2023

(65) Prior Publication Data

US 2024/0166978 A1 May 23, 2024

(30) Foreign Application Priority Data

Nov. 4, 2022 (WO) ................ PCT/CN2022/129893

(51) Int. Cl.

| | |
|---|---|
| ***C11D 1/94*** | (2006.01) |
| ***C11D 1/28*** | (2006.01) |
| ***C11D 1/88*** | (2006.01) |
| ***C11D 1/90*** | (2006.01) |
| ***C11D 17/06*** | (2006.01) |

(52) U.S. Cl.

CPC ................ *C11D 17/06* (2013.01); *C11D 1/28* (2013.01); *C11D 1/88* (2013.01); *C11D 1/90* (2013.01); *C11D 1/94* (2013.01)

(58) Field of Classification Search

CPC .. C11D 1/146; C11D 1/90; C11D 1/92; C11D 1/94; C11D 3/046; C11D 3/10; C11D 3/122; C11D 7/12; C11D 9/12; C11D 17/065; C11D 2111/12

See application file for complete search history.

(56) References Cited

U.S. PATENT DOCUMENTS

| | | | | |
|---|---|---|---|---|
| 5,178,798 A * | 1/1993 | Jolicoeur | ............. | C11D 3/3761 510/351 |
| 2017/0137747 A1* | 5/2017 | Tang | ......................... | C11D 1/37 |
| 2017/0137748 A1* | 5/2017 | Tang | ....................... | C11D 17/06 |

FOREIGN PATENT DOCUMENTS

| | | | |
|---|---|---|---|
| CA | 2293530 A1 | | 12/1998 |
| WO | 2019213890 A1 | | 11/2019 |
| WO | 2022/047604 | * | 3/2022 |
| WO | 2022047604 A1 | | 3/2022 |
| WO | 2022162062 A1 | | 8/2022 |
| WO | 2022162221 A1 | | 8/2022 |

OTHER PUBLICATIONS

PCT Search Report and Written Opinion for PCT/CN2022/129893 dated Apr. 20, 2023. 10 pages.

* cited by examiner

*Primary Examiner* — Charles I Boyer

(74) *Attorney, Agent, or Firm* — Gary J. Foose

(57) ABSTRACT

A method of making detergent granules, wherein the detergent granules comprise: (i) an alkyl sulfate (AS) having a branched or linear unalkoxylated alkyl group comprising from 6 to 18 carbon atoms; (ii) an amphoteric surfactant; and (iii) a water-soluble inorganic salt, wherein the method comprises the steps in sequence: a) preheating the AS paste at 50~80° C., and then b) adding the water-soluble inorganic salt into the AS paste with agitation at 50~80° C. to form a mixture, and then c) adding the amphoteric surfactant into the mixture at 50~80° C. to form a mixed paste, and then d) drying the mixed paste to form the detergent granules.

10 Claims, No Drawings

METHOD OF MAKING DETERGENT GRANULES COMPRISING AN ALKYL SULFATE, AMPHOTERIC SURFACTANT, AND INORGANIC SALT MIXTURE

FIELD OF THE INVENTION

The present invention relates to a method of making detergent granules that can be used to make cleaning products, especially granular detergent products.

BACKGROUND OF THE INVENTION

Mid-cut alkyl sulfate (MCAS or AS) with a $C_6$-$C_{16}$ branched or unbranched unalkoxylated alkyl group has been discovered to be effective for suds-boosting when it is used as a co-surfactant in cleaning compositions, particularly in dry laundry detergent compositions. For example, WO2009010911 discloses the use of MCAS for boosting suds in a LAS-based surfactant system and forming a detergent composition with a reduced total surfactant level, but without apparently deteriorating the sudsing profile of the detergent composition. However, more enhanced suds-boosting effect is desirable for consumers who hand-wash fabrics. Particularly, these consumers consider copious suds in the wash as the primary and most desirable signal of cleaning. Thus, there is still a need for detergent compositions capable of generating more suds during the wash.

Amphoteric surfactants such as Amine oxides or betaine are widely used as co-surfactants in consumer products such as shampoos, conditioners, and detergent products, as providing suds-boosting and creamy suds benefit. However, such amphoteric surfactants are mainly used in the liquid form of detergent products, there are process challenges on drying the liquid amphoteric surfactant to be compatible with powder detergent. For example, Liquid CAP-Betaine contains high level of salt (NaCl) as byproduct, this level of NaCl has great potential to cause corrosion during drying which would lead to equipment damage and contamination of the product. There is a need to overcome such processing difficulties. The applicant has discovered that making a detergent granule comprising MCAS and amphoteric surfactant and then introduce the granule into dry detergent composition can provide advantageous or more desirable sudsing profile, and at the same time overcomes the challenges of flowability and process difficulties. The process of making the detergent granule comprising MCAS and amphoteric surfactant is ideally conducted in current MCAS production system, to saving on capital equipment and processing time. However, it is observed that adding the liquid amphoteric surfactant directly into MCAS paste will cause a significant increase of viscosity and gelling phenomenon, resulting in mixing difficulties and other uncertainty on processing, e.g., massive reduction of drying efficiency. Therefore, in order to overcome the challenges on the paste thickening/gelling, and avoid potential mixing, drying issue in the process, there is a need to provide an optimized process of making the detergent granules containing MCAS and amphoteric surfactants.

SUMMARY OF THE INVENTION

The present invention has discovered, surprisingly and unexpectedly, that adding water-soluble inorganic salts into the system and controlling the order of addition can greatly eliminate the paste thickening/gelling and avoid mixing difficulties in the process. One aspect relates to adding water-soluble inorganic salts before the amphoteric surfactant into MCAS. Another aspect relates to adding the amphoteric surfactant combined with the water-soluble inorganic salt into MCAS. Both methods can eliminate gelling/thickening and avoid potential mixing difficulties. In addition, the process for making the detergent granules containing MCAS and amphoteric surfactant in the present invention surprisingly overcome the challenge of potential corrosion issue caused for processing/drying amphoteric surfactant (e.g., betaine).

In one aspect, the present invention relates to a method of making detergent granules, wherein the detergent granules comprise: (i) an alkyl sulfate (AS) having a branched or linear unalkoxylated alkyl group comprising from 6 to 18 carbon atoms; (ii) an amphoteric surfactant; and (iii) a water-soluble inorganic salt, wherein the method comprises the steps in sequence:

1) preheating the AS paste at 50~80° C., and then
2) adding the water-soluble inorganic salt into the AS paste with agitation at 50~80° C. to form a mixture, and then
3) adding the amphoteric surfactant into the mixture at 50~80° C. to form a mixed paste, and then
4) drying the mixed paste to form the detergent granules.

In another aspect, the present invention relates to a method of making detergent granules, wherein the detergent granules comprise: (i) an alkyl sulfate (AS) having a branched or linear unalkoxylated alkyl group comprising from 6 to 18 carbon atoms; (ii) an amphoteric surfactant; and (iii) a water-soluble inorganic salt, wherein the method comprises the steps:

a) provide a mixture of the amphoteric surfactant and the water-soluble inorganic salt,
b) preheating the AS paste at 50~80° C., and then
c) adding the mixture from the step a) into the preheated AS paste in step b) with agitation at 50~80° C. to form a mixed paste, and
d) drying the mixed paste to form the detergent granules.

Preferably, the step a) and step b) can be conducted in any order, i.e., the step a) can be conducted before the step b), or the step a) can be conducted after the step b), or the step a) can be conducted at the same time as the step b).

In an exemplary/preferred embodiment, the step a) is to premix the water-soluble inorganic salt with the amphoteric surfactant to form a mixture.

Preferably, the temperature of each step, if provided, is at 60~75° C.

In another aspect, the present invention relates to the detergent granule made by the above-mentioned method.

In yet another aspect, the present invention relates to a cleaning composition comprising from about 0.1% to about 50%, preferably from 0.2% to 30%, more preferably from 0.3% to 20%, by weight of such cleaning composition, of the detergent granule made by the above-mentioned method.

In still another aspect, the present invention relates to the use of the above-mentioned cleaning composition for washing fabrics.

It is an advantage that the present invention provides an efficient and cost-effective method to make free flow co-surfactant granules comprising MCAS with amphoteric surfactant. Said detergent granules can providing comparative or even superior flowability compared with detergent granules without amphoteric surfactant, at the meantime, to minimize the disruption to current MCAS production process and ensure the mixed paste can be processed with current equipment (e.g., paste mixing, pumping and drying).

It is another advantage that the present invention provides a process which can reduce or eliminate the corrosion/pitting for equipment during drying process caused by salt byproduct contained in liquid amphoteric surfactant (e.g., betaine).

These and other aspects of the present invention will become more apparent upon reading the following detailed description of the invention.

DETAILED DESCRIPTION OF THE INVENTION

Features and benefits of the various embodiments of the present invention will become apparent from the following description, which includes examples of specific embodiments intended to give a broad representation of the invention. Various modifications will be apparent to those skilled in the art from this description and from practice of the invention. The scope of the present invention is not intended to be limited to the particular forms disclosed and the invention covers all modifications, equivalents, and alternatives falling within the spirit and scope of the invention as defined by the claims.

As used herein, articles such as "a" and "an" when used in a claim, are understood to mean one or more of what is claimed or described. The terms "comprise," "comprises," "comprising," "contain," "contains," "containing," "include," "includes" and "including" are all meant to be non-limiting.

As used herein, the term "granule" or "particle" refers to a solid matter of minute quantity, such as a powder, granule, encapsulate, microcapsule, and/or prill. The granules or particles of the present invention can be spheres, rods, plates, tubes, squares, rectangles, discs, stars or flakes of regular or irregular shapes, but they are non-fibrous. The granules or particles of the present invention may have a median particle size of about 2000 μm or less, as measured according to the Median Particle Size Test described herein. Preferably, the particles of the present invention have a median particle size ranging from about 1 μm to about 2000 μm, more preferably from about 10 μm to about 1800 μm, still more preferably from about 50 μm to about 1700 μm, still more preferably from about 100 μm to about 1500 μm, still more preferably from about 250 μm to about 1000 μm, most preferably from about 300 μm to about 800 μm, as measured according to the Median Particle Size Test described herein.

As used herein, the term "detergent granule" refers to particles containing one or more detersive actives, including but not limited to surfactants, bleaching agents, enzymes, polymers, chelants, and combinations thereof.

As used herein, the term "cleaning composition" includes, unless otherwise indicated, granular or powder-form all-purpose or "heavy-duty" washing agents, especially cleaning detergents, for fabrics, as well as cleaning auxiliaries such as bleach, rinse aids, additives, or pre-treat types; hand dishwashing agents or light duty dishwashing agents, especially those of the high-foaming type; machine dishwashing agents; mouthwashes, denture cleaners, car or carpet shampoos, bathroom cleaners; hair shampoos and hair-rinses; shower gels and foam baths and metal cleaners; as well as cleaning auxiliaries such as bleach additives or pre-treat types. In one preferred aspect, the cleaning composition is a solid laundry detergent composition, and more preferably a free-flowing particulate laundry detergent composition (i.e., a granular laundry detergent product).

As used herein, the term "Median Particle Size" refers to the mid-point of the distribution of the particle sizes of the detergent granule, as measured by the Sieve Test as disclosed herein.

As used herein, the term "aspect ratio" refers to the ratio of the largest diameter of an article over the smallest diameter of such article orthogonal to the largest diameter.

As used herein, the term "water-soluble" refers to a solubility of more than about 25 grams per liter (g/L) of deionized water measured at 20° C. and under the atmospheric pressure.

As used herein, the terms "consisting essentially of" means that the composition contains less than about 1%, preferably less than about 0.5%, of ingredients other than those listed.

Further, the terms "essentially free of," "substantially free of" or "substantially free from" means that the indicated material is present in the amount of from 0 wt % to about 0.5 wt %, or preferably from 0 wt % to about 0.1 wt %, or more preferably from 0 wt % to about 0.01 wt %, and most preferably it is not present at analytically detectable levels. The term "substantially pure" or "essentially pure" means that the indicated material is present in the amount of from about 99.5 wt % to about 100 wt %, preferably from about 99.9 wt % to about 100 wt %, and more preferably from 99.99 wt % to about 100 wt %, and most preferably all other materials are present only as impurities below analytically detectable levels.

Method of Making Detergent Granules

The present invention relates to a method of making detergent granules, wherein the detergent granules comprise: (i) an alkyl sulfate (AS) having a branched or linear unalkoxylated alkyl group comprising from 6 to 18 carbon atoms; (ii) an amphoteric surfactant; and (iii) a water-soluble inorganic salt. Preferably, the amphoteric surfactant can be selected from the group consisting of amine oxide, betaine, sulfobetaine (sultaine), and combinations thereof. The making method comprises the steps in sequence: first, preheating the AS surfactant at about 50~80° C., secondly, adding water soluble inorganic salt into the preheated AS with agitation at 50~80° C. to form a mixture, and thirdly, adding the amphoteric surfactant into the mixture at 50~80° C. to form a mixed paste, and finally, drying the mixed paste to form the detergent granules.

In the examples of where the amphoteric surfactant is amine oxide, the weight ratio of AS to the amine oxide is preferred from about 2:1 to about 40:1, preferably from about 3:1 to about 35:1, more preferably from about 4:1 to about 30:1.

In the examples of where the amphoteric surfactant is betaine or sultaine, the weight ratio of AS to the betaine (or sultaine) is preferred from about 10:1 to about 40:1, preferably from about 12:1 to about 35:1, more preferably from about 12:1 to about 30:1.

In another aspect, the making method comprising the steps of (a) providing a mixture of the amphoteric surfactant with the water-soluble inorganic salt, (b) preheating the AS at 50~80° C., and then (c) adding the mixture from the step (a) into the preheated AS in step (b) with agitation at 60~75° C. to form a mixed paste, and (d) drying the mixed pasted formed in the step (c) to form the detergent granules. The premix step (a) can be conducted before the preheating step (b), or after the preheating step (b), or the premix step (a) and preheating step (b) can be conducted at the same time. The premix step (a) can be conducted at ambient temperature or an increased temperature of 30~80° C.

In preferred embodiments, the step (a) comprises premixing the water-soluble inorganic salt with the amphoteric surfactant, optionally at 50~80° C., to make the mixture. In an alternative embodiment, the step (a) can include providing a mixture of the amphoteric surfactant with the water-soluble inorganic salt where the latter is existed/introduced from the (previous) manufacturing procedure.

By the way of adding the water-soluble inorganic salt before liquid amphoteric surfactant into MCAS, or adding the water-soluble inorganic salt together with liquid amphoteric surfactant into MCAS, will greatly eliminate the paste thickening/gelling phenomenon occurred when adding amphoteric surfactant directly into MCAS. In such way, the making process can be conducted in the current MCAS making equipment thus saving capital cost and energy for manufacturing.

MCAS

The AS surfactant used in the detergent granule of the present invention contains a branched or linear unalkoxylated alkyl group containing from about 6 to about 18 carbon atoms, and is therefore also referred to as Mid-Cut AS or MCAS.

Preferably, the AS has the generic formula of R—O—$S_3^-M^+$, while R is branched or linear unalkoxylated $C_6$-$C_{16}$ alkyl group, and M is a cation of alkali metal, alkaline earth metal or ammonium. More preferably, the R group of the AS surfactant contains from about 8 to about 16 carbon atoms, more preferably from about 10 to about 14 carbon atoms, most preferably from about 12 to about 14 carbon atoms. R can be substituted or unsubstituted, and is preferably unsubstituted. R is substantially free of any alkoxylation. M is preferably a cationic of sodium, potassium, or magnesium, and more preferably M is a sodium cation.

Preferably, but not necessarily, the detergent granule described in the present invention contains a mixture of $C_6$-$C_{16}$ AS surfactants, in which $C_8$-$C_{14}$ AS surfactants are present in an amount ranging from about 85% to about 100% by total weight of the mixture. This mixture can be referred to as a "$C_8$-$C_{14}$-rich AS mixture." More preferably, such $C_8$-$C_{14}$-rich AS mixture contains from about 90 wt % to about 100 wt %, or from 92 wt % to about 98 wt %, or from about 94 wt % to about 96 wt %, or 100 wt % (i.e., pure), of $C_8$-$C_{14}$ AS.

In a particularly preferred embodiment of the present invention, the detergent granule contains a mixture of $C_6$-$C_{16}$ AS surfactants with from about 30 wt % to about 100 wt % or from about 50 wt % to about 99 wt %, preferably from about 60 wt % to about 95 wt %, more preferably from about 65 wt % to about 93 wt %, and most preferably from about 70 wt % to about 80 wt % of $C_{12}$ AS. Further, such mixture of $C_6$-$C_{16}$ AS surfactants may contain from about 10 wt % to about 100 wt %, preferably from 15 wt % to about 50 wt %, and more preferably from 20 wt % to about 30 wt % of $C_{14}$ AS. This mixture can be referred to as a "$C_{12}$-$C_{14}$-rich AS mixture."

In a most preferred embodiment of the present invention, the detergent granule contains a mixture of AS surfactants that consists essentially of $C_{12}$ and/or $C_{14}$ AS surfactants. For example, such mixture of AS surfactant may consist essentially of from about 70 wt % to about 80 wt % of $C_{12}$ AS and from 20 wt % to about 30 wt % of $C_{14}$ AS, with little or no other AS surfactants therein. Such mixture may also consist of substantially pure $C_{12}$ AS, or alternatively, substantially pure $C_{14}$ AS.

In another more preferred embodiment of the present invention, the detergent granule contains a mixture of majority of $C_{12}$-$C_{14}$ AS surfactant and minor of $C_{16}$ AS surfactant. For example, the AS surfactant in the detergent granule may comprise from about 70% to about 99%, preferably from about 80% to about 99%, of $C_{12}$-$C_{14}$ AS surfactant and from about 1% to about 20%, preferably from about 1% to about 10%, of $C_{16}$ AS surfactant.

A commercially available AS mixture particularly suitable for practice of the present invention is Texapon® V95 G from Cognis (Monheim, Germany).

Further, the detergent granule of the present invention may contain a mixture of $C_6$-$C_{16}$ AS surfactants comprising more than about 50 wt %, preferably more than about 60 wt %, more preferably more than 70 wt % or 80 wt %, and most preferably more than 90 wt % or even at 100 wt % (i.e., substantially pure), of linear AS surfactants having an even number of carbon atoms, including, for example, $C_6$, $C_8$, $C_{10}$, $C_{12}$, $C_{14}$, and $C_{16}$ AS surfactants.

The mixture of $C_6$-$C_{16}$ AS surfactants as described can be readily obtained by sulphonation of alcohol(s) with the corresponding numbers of carbon atoms. The required carbon chain length distribution can be obtained by using alcohols with the corresponding chain length distribution prepared either synthetically or extracted/purified from natural raw materials or formed by mixing corresponding pure starting materials. For example, the mixture of $C_6$-$C_{16}$ AS surfactants may be derived from naturally occurring triglycerides, such as those contained in palm kernel oil or coconut oil, by chemically processing such triglycerides to form a mixture of long chain alcohols and then sulphonating such alcohols to form AS surfactants. The mixture of alcohols derived from the naturally occurring triglycerides typically contain more than about 20 wt % of $C_{16}$-$C_{16}$ alcohols. A mixture containing a lower proportion of $C_{16}$-$C_{16}$ alcohols may be separated from the original mixture before the sulphonation step, in order to form the desired mixture of $C_6$-$C_{16}$ AS surfactants as described hereinabove. Alternatively, the desired mixture of $C_6$-$C_{16}$ AS surfactants can be readily obtained by separating and purifying the already formed AS mixtures. Suitable separation and purification methods include, but are not limited to: distillation, centrifugation, recrystallization and chromatographic separation.

The amount of AS surfactant(s) present in the detergent granule of the present invention may range from about 50 wt % to about 95 wt %, and preferably from about 75 wt % to about 93 wt % by total weight of the detergent granule. With such a high level of AS surfactant(s), the detergent granule of the present invention exhibits a high detersive activity and a very good dissolution profile. In a most preferred embodiment of the present invention, the detergent granule contains from about 75 wt % to about 93 wt %, preferably from about 80 wt % to about 86 wt %, of an AS mixture consisting essentially of from about 70 wt % to about 80 wt % of $C_{12}$ AS and from 20 wt % to about 30 wt % of $C_{14}$ AS.

Amphoteric Surfactant

The amphoteric surfactant in the detergent granule described in the present invention can be either a betaine having formula (I), (I)

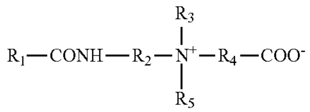

wherein $R_1$ is a linear alkyl group containing from 8 to 22 carbon atoms; $R_2$ is an alkylene group containing from 2 to 5 carbon atoms, and preferably an ethylene or propylene group; $R_3$ and $R_5$ are independently alkyl groups containing from 1 to 5 carbon atoms, and preferably methyl or ethyl groups; $R_4$ is an alkylene group containing from 1 to 3 carbon atoms, and preferably a methylene or ethylene group;

or a sultaine having formula (II), (II)

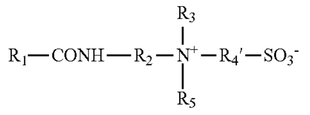

wherein $R_1$ is a linear alkyl group containing from 8 to 22 carbon atoms; $R_2$ is an alkylene group containing from 2 to 5 carbon atoms, and preferably an ethylene or propylene group; $R_3$ and $R_5$ are independently alkyl groups containing from 1 to 5 carbon atoms, and preferably methyl or ethyl groups; $R_4'$ is an alkylene or hydroxyl alkylene group containing from 1 to 3 carbon atoms, and preferably a methylene, ethylene or hydroxypropylene ($CH_2CHOHCH_2$) group;

Preferably, the amphoteric surfactant can be a betaine or a sultaine selected from the group consisting of: almondamidopropyl betaine, apricotamidopropyl betaine, avocadamidopropyl betaine, babassuamidopropyl betaine, behenamidopropyl betaine, canolamidopropyl betaine, capryl/capramidopropyl betaine, cocoamidopropyl betaine, coco/oleamidopropyl betaine, coco/sunfloweramidopropyl betaine, cupuassuamidopropyl betaine, isostearamidopropyl betaine, lauramidopropyl betaine, meadowfoamamidopropyl betaine, milkamidopropyl betaine, minkamidopropyl betaine, myristamidopropyl betaine, oatamidopropyl betaine, oleamidopropyl betaine, olivamidopropyl betaine, palmamidopropyl betaine, palmitamidopropyl betaine, palm kernelamidopropyl betaine, ricinoleamidopropyl betaine, sesamidopropyl betaine, shea butteramidopropyl betaine, soyamidopropyl betaine, stearamidopropyl betaine, tallowamidopropyl betaine, undecyleneamidopropyl betaine, wheat germamidopropyl betaine, cocamidopropyl hydroxysultaine (CAPHS), lauramidopropyl hydroxysultaine (LAPHS), oleamidopropyl hydroxysultaine (OAPHS), tallowamidopropyl hydroxysultaine (TAPHS), and combinations thereof; preferably selected from the group consisting of cocoamidopropyl betaine, lauramidopropyl betaine, oleamidopropyl betaine, tallowamidopropyl betaine, cocamidopropyl hydroxysultaine, and combinations thereof; and more preferably, selected from cocoamidopropyl betaine, lauramidopropyl betaine, or a combination thereof.

Preferably, the betaine or sultaine, if present, is present in an amount of from about 2% to about 20% in the detergent granules of the present invention.

Amine Oxide

Amine oxides are amphoteric/zwitterionic surfactants that can be used in detergent products. Typically, amine oxides are synthesized from long-chain fatty molecules which are derived from, for example, lauric-containing triglyceride oils such as coconut oil or palm kernel oil. The amine oxide used in the detergent granule of the present invention may comprise alkyl amine oxide. The amine oxide used in the detergent granule of the present invention may have the formula (III):

(III)

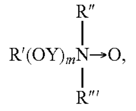

wherein R' is a $C_{8-22}$ alkyl, a $C_{8-22}$ hydroxyalkyl, a $C_{8-22}$ alkyl phenyl, or a $R^6$—X—$R^7$— group; wherein $R^6$ is a $C_{8-22}$ alkyl group, $R^7$ is a $C_{1-3}$ alkylene group, and X is a bivalent moiety selected from the group consisting of aminocarbonyl, carbonylamino, carbonyloxy, oxycarbonyloxy, aminocarbonylamino and combinations and derivatives thereof; OY is an alkoxy moiety selected from the group consisting of ethoxy, propoxy, butoxy and combinations thereof; m is from 0 to 3; R" and R'" are independently selected from the group consisting of a $C_{1-3}$ alkyl group, a $C_{1-3}$ hydroxyalkyl group and combinations thereof.

Preferably, R' in formula (III) is a $C_{10-18}$ alkyl or a $R^6$—X—$R^7$— group, wherein $R^6$ is a $C_{10-18}$ alkyl, $R^7$ is an ethylene or propylene group, and X is a carbonylamino group; OY is an ethoxy or propoxy group; m is from 0 to 3; R" and R'" are independently selected from the group consisting of methyl, ethyl, propyl, isopropyl, 2-hydroethyl, 1-hydroxypropyl, 3-hydroxypropyl group and combination thereof.

Preferably, the amine oxide used in the detergent granule of the present invention may be selected from the group consisting of a $C_{10-18}$ alkyl dimethyl amine oxide, a $C_{8-16}$ alkyl ethoxy dihydroxy ethyl amine oxide, a $C_{10-18}$ alkyl amidopropyl dimethyl amine oxide, and combinations thereof. More preferably, the amine oxide surfactant of the present invention is a $C_{12-16}$ alkyl dimethyl amine oxide, a $C_{12-16}$ alkylamidopropyl dimethyl amine oxide, or a combination thereof. More preferably, the amine oxide may be coco alkyl dimethyl amine oxide, alkylamidopropylamine N-oxide, lauramine oxide or an any combinations thereof.

The amine oxide may be present in the detergent granule ranging from about 2 wt % to about 50 wt %, preferably from about 4% to about 40%, more preferably from about 5% to about 35% by total weight of the detergent granule.

Water-Soluble Inorganic Salt

The detergent granule described in the present invention further comprises 0.5% to 20% of water-soluble inorganic salt.

The addition of water-soluble salt may help to improve flowability of the particle, thus make it easy to handle during storage, shipping and manufacturing. On the other hand, if the detergent granule contains too high amount of the water-soluble inorganic salt, the amount of MCAS and amine oxide surfactant in such detergent granule likely must be reduced, which is undesirable. The water-soluble salt used in the detergent granule of the present invention can be selected from the group consisting of sodium sulfate, sodium carbonate, magnesium chloride, magnesium sulfate, sodium silicate, and combinations thereof. Preferably, the water-soluble salt is selected from sodium sulfate, sodium carbonate, or a combination thereof.

The amount of water-soluble salt present in the detergent granule of the present invention may range from about 0.5 wt % to about 20 wt %, preferably from about 1 wt % to about 15 wt %, and more preferably from about 2 wt % to about 10 wt %.

In some examples, part of or all of the water-soluble inorganic salts can be already existed in the amphoteric surfactant (e.g., betaine) from manufacturing process.

Water Content

The detergent granule of the present invention may contain from about 1 wt % to about 5 wt % of water, preferably from about 1.5 wt % to about 4 wt %, more preferably from about 2 wt % to about 3 wt %. Too much water in the detergent granule may adversely affect its flowability and handability.

Other Ingredients

The detergent granule of the present invention may contain one or more other ingredients, such as silica, zeolite, other surfactants, enzymes, bleach actives, chelants, perfumes, dyes, fluorescent materials, and the like.

Preferably, the detergent granule of the present invention consists essentially of the above-mentioned MCAS, amine oxide, water-soluble salt, and water. More preferably, the detergent granule of the present invention is essentially free of other ingredients.

Detergent Granule

The detergent granule made by the method of the present invention comprises: (a) from about 60% to about 95% of an alkyl sulfate (AS) having a branched or linear unalkoxylated alkyl group comprising from 6 to 16 carbon atoms; (b) from about 2% to about 30% of an amine oxide or from about 2% to about 20% of a betaine or sultaine; and (c) from about 0.5% to about 20%, preferably from about 1% to about 15%, more preferably from about 2% to about 10%, of water-soluble inorganic salts.

In some preferred embodiments, where the amphoteric surfactant is an amine oxide, the weight ratio of said AS over said amine oxide is from about 2:1 to about 40:1. For example, the weight ratio of said AS over amine oxide is from about 3:1 to about 35:1, alternatively from about 3.5:1 to about 30:1. Preferably, the weight ratio of AS over amine oxide in the detergent granule of the present invention is from about 4:1 to about 30:1. In a preferred embodiment, the detergent granule comprises a $C_{10}$-$C_{14}$ linear or branched unalkoxylated alkyl sulfate (AS) and a $C_{10}$-$C_{16}$ Alkyl dimethylamines, N-oxides. In another preferred embodiment, the detergent granule comprises a $C_{12}$-$C_{16}$ linear or branched unalkoxylated alkyl sulfate (AS) and a $C_{10}$-$C_{16}$ Alkyl dimethylamines, N-oxides.

Size and Shape of Detergent Granule

The detergent granule of the present invention may be characterized by a Medium Particle Size ranging from about 20 μm to about 2000 μm, preferably from about 200 μm to about 100 μm, more preferably from about 250 μm to about 600 μm.

Further, it may be characterized by an aspect ratio of no more than 2, preferably no more than 1.5, more preferably not more than 1.2, most preferably no more than 1.1. The detergent granule of the present invention preferably has a spherical or substantially spherical shape, which functions to further improve its flowability and handleability during storage and shipment.

In some examples, the detergent granule of the present invention may be of a needle shape, where the diameter is in the range of 0.6~1.2 mm, and more preferably 0.6~0.8 mm and length ranges from 2 to 15 mm and more preferably from 4 to 10 mm.

Cleaning Composition

The detergent granule of the present invention may be used alone for cleaning, but preferably it is combined with other particles to form a cleaning composition, such as a granular laundry detergent product.

In one aspect, the detergent granule is typically added to the cleaning composition at a level of from about 0.1 wt % to about 50 wt %, preferably from about 0.2 wt % to about 40 wt %, or from about 0.3 wt % to about 30 wt %, alternatively from about 0.5 wt % to about 20 wt %, or from about 0.5 wt % to about 15 wt %; more preferably from about 0.5 wt % to about 10 wt %, or from about 0.8 wt % to about 8 wt % by weight of the cleaning composition. Preferably, the cleaning composition is a granular detergent composition.

The detergent granule made by the method of the present invention may be combined with other particles such as, for example: surfactant particles, such as anionic detersive surfactant particles (especially those containing LAS) including agglomerates and extrudates, non-ionic detersive surfactant particles including agglomerates or extrudates, and cationic detersive surfactant particles including agglomerates and extrudates; enzyme particles; perfume particles including agglomerates or extrudates of perfume microcapsules, and perfume encapsulates such as starch encapsulated perfume accord particles; polymer particles including soil release polymer particles, cellulosic polymer particles; buffer particles including carbonate salt and/or silicate salt particles, preferably a particle comprising carbonate salt and silicate salt such as a sodium carbonate and sodium silicate co-particle, and particles and sodium bicarbonate; other spray-dried particles; fluorescent whitening particles; aesthetic particles such as coloured noodles or needles or lamellae particles; bleaching particles such as percarbonate particles, especially coated percarbonate particles, including carbonate and/or sulfate coated percarbonate, silicate coated percarbonate, borosilicate coated percarbonate, sodium perborate coated percarbonate; bleach catalyst particles, such as transition metal catalyst bleach particles, and imine bleach boosting particles; performed peracid particles; hueing dye particles; and any mixture thereof.

In addition to the detergent granule described hereinabove, the cleaning composition of the present invention may further comprise one or more surfactant selected from the group consisting of: (1) a $C_{10}$-$C_{20}$ linear alkylbenzene sulphonate (LAS); (2) a $C_{10}$-$C_{20}$ linear or branched alkylalkoxylated sulfate (AAS), (3) nonionic surfactant, and (4) combinations thereof. It is preferred that the cleaning composition of the present invention comprises, in addition to the detergent granule described hereinabove, $C_{10}$-$C_{20}$ linear alkylbenzene sulphonate (LAS), and more preferably such cleaning composition further comprises a fatty acid or salt thereof. The MCAS-containing detergent granule of the present invention may interact with such LAS and fatty acid/salt to provide an improved sudsing profile.

It may also be especially preferred for the cleaning composition to comprise low levels, or even be substantially free, of builder. In a preferred embodiment, the cleaning composition comprises no builder.

Method of Use

The cleaning composition is typically used for cleaning and/or treating a situs inter alia a surface or fabric. As used herein, "surface" may include such surfaces such as dishes, glasses, and other cooking surfaces, hard surfaces, hair or skin. Such method includes the steps of contacting an embodiment of the cleaning composition, in neat form or diluted in a wash liquor, with at least a portion of a surface or fabric, then optionally rinsing such surface or fabric. The surface or fabric may be subjected to a washing step prior to the aforementioned rinsing step. For purposes of the present invention, "washing" includes but is not limited to, scrubbing, wiping, and mechanical agitation.

The composition solution pH is chosen to be the most complimentary to a target surface to be cleaned spanning broad range of pH, from about 5 to about 11. For personal care such as skin and hair cleaning pH of such composition preferably has a pH from about 5 to about 8, and for laundry cleaning compositions pH of from about 8 to about 10. The compositions are preferably employed at concentrations of from about 200 ppm to about 10,000 ppm in solution. The water temperatures preferably range from about 5° C. to about 100° C.

In one aspect, a method of laundering fabrics using the cleaning composition of the present invention is disclosed. The method may comprise the steps of contacting a fabric to be laundered with the cleaning composition or a wash liquor formed thereby. The fabric may comprise most any fabric capable of being laundered in normal consumer use conditions.

The cleaning composition herein is especially well-suited for use in a hand-washing context. It can also be used in automatic mashing washing using a top-loading or front-loading automatic washing machine.

The cleaning composition may be employed at concentrations of from about 500 ppm to about 15,000 ppm in solution, and optionally, more dilute wash conditions can be used. Optionally, 50 g or less, or 45 g or less, or 40 g or less, or 35 g or less, or 30 g or less, or 25 g or less, or 20 g or less, or even 15 g or less, or even 10 g or less of the cleaning composition is dissolved into water to form a wash liquor. The wash liquor preferably has a pH of from about 8 to about 10.5. The wash liquor may comprise 40 litres or less of water, or 30 litres or less, or 20 litres or less, or 10 litres or less, or 8 litres or less, or even 6 litres or less of water. The wash liquor may comprise from above 0 to 15 litres, or from 2 litres, and to 12 litres, or even to 8 litres of water. For dilute wash conditions, the wash liquor may comprise 150 litres or less of water, 100 litres or less of water, 60 litres or less of water, or 50 litres or less of water, especially for hand washing conditions, and can depend on the number of rinses. The water to fabric ratio is typically from about 1:1 to about 30:1. Typically, from 0.01 Kg to 2 Kg of fabric per litre of wash liquor is dosed into the wash liquor.

It is preferable that the cleaning composition can be used in hard water conditions where the water hardness is between about 17 ppm to about 600 ppm; or from about 34 ppm to about 340 ppm; or from about 51 ppm to about 300 ppm of hard water ions such as $Ca^{2+}$, $Mg^{+}$, etc., or such as $Ca^{2+}$ and $Mg^{2+}$. It is also preferable that the cleaning composition can be used in cold water temperature, where the temperature is from about 5° C. to about 40° C., or from about 20° C. to about 30° C., or from about 15° C. to about 25° C., as well as all other combinations within the range of about 15° C. to about 35° C., and all ranges within 10° C. to 40° C.

Test Methods

The following techniques must be used to determine the properties of the detergent granules and detergent compositions of the invention in order that the invention described and claimed herein may be fully understood.

Shear Viscosity Measurement:

The shear viscosity of MCAS paste mixtures (see composition table 4 below) with different amphoteric surfactant types, MCAS-Amphoteric ratios and sodium sulfate is measured by Malvern Kinexus Lab+ rotational rheometer with a cone-to-plate geometry at 60° C. Gently load a small amount of paste mixture onto the bottom plate and lower down the upper cone to 0.1403 mm gap, the loaded sample is then trimmed using a spatula. Then a flow ramp test was conducted with a shear rate range from 0.01 to 100 $s^{-1}$.

Corrosion Test

The Corrosion Test used in the present invention is measuring Electrochemical Corrosion Rate via cyclic Potentiodynamic Polarization. It is to determine electrochemical corrosion/pitting behavior of metallic materials immersed in electrolyte solutions.

Procedure:

A cylindrical metal sample with known mass and surface area is firstly washed with detergent or propanol, then thoroughly dried and attached to a conductive metal electrode. 1 litre of electrolyte solution is then prepared by dissolving the required electrolyte materials in water to the required dilution percentage. Sodium sulfate solution is prepared by dissolving 5 grams of sodium sulphate powder in 45 milliliters of deionized water. The electrode with metal sample is inserted into the inner chamber of a glass vessel which has suitable round ports for inserting and holding the electrode. The external chamber of the glass vessel is filled with water which is continuously circulated through an electric thermostat in order to maintain a constant electrolyte temperature within the vessel. A graphite counter electrode is then inserted into the inner chamber of the glass vessel through another of the round ports. 5 ml of the sodium sulfate solution is added to a bridge tube to act as the salt bridge, and a reference metal electrode is then inserted through the bridge tube. The reference electrode with attached bridge tube is then inserted into the inner chamber of the glass vessel through another of the round ports. The electrolyte solution (of the Examples to be test) is then poured into the inner chamber of the vessel using a funnel. The pitting potential is then measured by connecting the electrodes to a suitable potentiostat measuring device such as Gamry Interface1010E potentiostat. The associated Gamry Framework software is used to carry out a cyclic polarization test where the open circuit potential was firstly measured over 10 hours, followed by a potential scan to determine the pitting potential. The pitting potential result was recorded from the software and the metal sample was visually inspected for metal corrosion. For a given environment, above this electrochemical potential corrosion pits would begin to initiate on the metal surface. The higher the pitting potential, the lower the risk of pit formation driven by the chemical interactions with the metal surface.

EXAMPLES

Paste Preparation Method:

1. Preheat MCAS paste to 60 C.° in a properly sealed container to avoid evaporation.
2. Adding the 2nd ingredient (either amphoteric surfactant or sodium sulfate) into MCAS paste and mixing for 7 mins. A water bath with 65 deg C. set temperature is used to maintain the steady paste temperature during mixing.
3. Add the 3rd ingredient if needed and mix for 3 mins before shear viscosity measurements.

Paste Mixing Equipment and Condition

Overhead impeller: 10 cm in diameter, pitched with 4 blades

Size of beaker: 1000 mL with 10 cm in diameter
Mixing speed: 150 rpm
Water bath with set temperature of 65 deg C.

Comparative and Inventive Examples

Table 1 shows Examples 1 to 3 to make detergent granules comprising MCAS and betaine with or without addition of sodium sulfate salt. In particular, Example A is a control of testing viscosity of MCAS paste only, and Examples 1 and 2 relates to adding different amount of betaine directly into MCAS, and Example 3 (as inventive example) relates to method of pre-dissolve sodium sulfate into betaine and adding the mixture into MCAS. The viscosity under different shear rate (at 0.1 1/s and 0.4 1/s) are measured and recorded.

TABLE 1

| MCAS-Betaine | | | | |
|---|---|---|---|---|
| | Viscosity, Pa · s Examples | | | |
| | A Ref: MCAS^ Paste | 1 29:1 M-B* | 2 12:1 M-B | 3 29:1 M-(B-S)** |
| Active Betaine in paste, % | 0 | 2% | 5% | 2% |
| Oder of addition | N/A | betaine^^ RM added into MCAS paste | | Sulfate is pre dissolved into betaine, and then the premix is mixed with MCAS paste |
| shear rate at 0.1, 1/s | 365.8 | 761.6 | 427.0 | 183.8 |
| shear rate at 0.4, 1/s | 128.1 | 240.0 | 50.1 | 66.4 |

*M-B means MCAS + Betaine, 29:1 means the weight ratio of MCAS vs. Betaine in the final product.
**M-(B-S) means MCAS + (betaine + sulfate).
^MCAS is SLS 90/92 from Shanghai Auway Daily Chemicals (containing majority of $C_{12}$-$C_{14}$ alkyl sulfate with low level of $C_{16}$ alkyl sulfate).
^^Betaine is cocoamidopropyl betaine, RM: Raw Material.

It can be seen from the results that, with the ratio of MCAS to betaine ranging from 29:1 to 12:1, directly addition of betaine has more impact on the paste viscosity increase, while adding sodium sulfate together with betaine (premix sulfate with betaine) can significantly reduce the paste viscosity to a manageable range.

Table 2 summarizes Examples 4 to 7 which compare the methods of adding amine oxide into MCAS with or without addition of sulfate. Examples 4 to 6 relate to adding different amount of amine oxide directly into MCAS, and Example 7 (as inventive example) relates to method of pre-dissolve sodium sulfate into betaine and adding the mixture into MCAS. The viscosity under different shear rate (at 0.1 1/s and 0.4 1/s) are measured and recorded.

TABLE 2

| MCAS-AO | | | | | |
|---|---|---|---|---|---|
| | Viscosity, Pa · s Formula number | | | | |
| | A Ref: MCAS Paste | 4 29:1 M-A* | 5 4:1 M-A | 6 2:1 M-A | 7 4:1 M-(A-S)** |
| Order of addition | N/A | AO RM added into MCAS paste | | | Sulfate is pre dissolved into AO, and then the premix is mixed with MCAS paste |

TABLE 2-continued

| MCAS-AO | | | | | |
|---|---|---|---|---|---|
| | Viscosity, Pa · s Formula number | | | | |
| | A Ref: MCAS Paste | 4 29:1 M-A* | 5 4:1 M-A | 6 2:1 M-A | 7 4:1 M-(A-S)** |
| shear rate at 0.1, 1/s | 365.8 | 646.4 | 1288.0 | 1560.0 | 84.9 |
| shear rate at 0.4, 1/s | 128.1 | 255.4 | 299.2 | 214.4 | 34.3 |

*M-A means MCAS + amine oxide

**M-(A-S) means MCAS + (amine oxide + sulfate).

^MCAS is SLS 90/92 from Shanghai Auway Daily Chemicals (containing majority of $C_{12}$-$C_{14}$ alkyl sulfate with low level of $C_{16}$ alkyl sulfate).

^^AO is $C_{10}$-$C_{16}$ Alkyl dimethylamines, N-oxide (Solvay ZhangJiaGang Specialty)

Similarly, the results show that, with increase of amine oxide added into MCAS (i.e., ratio of MCAS:AO from 29:1 to 2:1), paste viscosity increase. While premixing sodium sulfate with AO before added into MCAS in Example 7 exhibits a significantly reduction of the paste viscosity to a manageable range.

Table 3 further provides Examples 8 to 10 that are conducted by adding sodium sulfate into MCAS, and inventive Examples 11 and 12 that adding sodium sulfate into MCAS first and then adding amphoteric surfactants.

TABLE 3

| MCAS-sulfate-Amphoteric surfactants | | | | | | |
|---|---|---|---|---|---|---|
| | Viscosity, Pa · s Example | | | | | |
| | A | 8 | 9 | 10 | 11 | 12 |
| shear rate(1/s) | Ref: MCAS Paste | 29:1 M-S* | 4:1 M-S | 2:1 M-S | 29:1 M-S-B^ | 4:1 M-S-A¯ |
| Order of addition | N/A | Sodium sulfate is added into MCAS paste directly | | | Sodium sulfate is added in MCAS paste first, and then added betaine or AO | |
| shear rate at 0.1, 1/s | 365.8 | 289.3 | 408.9 | 347.3 | 294.6 | 102.8 |
| shear rate at 0.4, 1/s | 128.1 | 78.24 | 123.8 | 84.6 | 67.50 | 52.14 |

*M-S means MCAS + sulfate

^M-S-B means MCAS + sulfate + betaine

¯M-S-A means MCAS + sulfate + amine oxide

Comparing Table 2 and Table 3, it can be clearly seen that adding AO directly into MCAS will significantly increase the paste viscosity (Example A vs. Example 4 to 6) which is undesirable. However, with adding sodium sulfate into MCAS, the paste viscosity can maintain or decrease, especially the method of adding sulfate first and then AO into MCAS can maintain the paste viscosity change to a minimal level for the entire tested range.

TABLE 4

| Compositional formulation of Examples tested, % | | | | | | | |
|---|---|---|---|---|---|---|---|
| | Example | | | | | | |
| | 1 | 2 | 3 | 4 | 5 | 6 | 7 |
| Weight percent in formula | 29:1 M-B | 12:1 M-B | 29:1 M-(B-S) | 29:1 M-A | 4:1 M-A | 2:1 M-A | 4:1 M-(A-S) |

TABLE 4-continued

| Compositional formulation of Examples tested, % | | | | | | | |
|---|---|---|---|---|---|---|---|
| LC MCAS Needle Paste | 92.41% | 83.34% | 89.57% | 92.85% | 64.14% | 47.24% | 62.45% |
| $Na_2SO_4$ solid | 0.00% | 0.00% | 3.07% | 0% | 0% | 0% | 2.64% |
| Betaine | 7.59% | 16.66% | 7.36% | 0% | 0% | 0% | 0% |
| AO | 0% | 0% | 0% | 7.15% | 35.86% | 52.76% | 34.91% |
| Total | 100.00% | 100.00% | 100.00% | 100.00% | 100.00% | 100.00% | 100.00% |
| After drying MCAS to Amphoteric ratio in detergent granule | 29:1 | 12:1 | 29:1 | 29:1 | 4:1 | 2:1 | 4:1 |

| | Example | | | | |
|---|---|---|---|---|---|
| | 8 | 9 | 10 | 11 | 12 |
| Weight percent in formula | 29:1 M-S | 4:1 M-S | 2:1 M-S | 29:1 M-S-B | 4:1 M-S-A |
| LC MCAS Needle Paste | 96.71% | 95.94% | 95.06% | 89.57% | 62.45% |
| $Na_2SO_4$ solid | 3.29% | 4.06% | 4.94% | 3.07% | 2.64% |
| Betaine | 0% | 0% | 0% | 7.36% | 0% |
| AO | 0% | 0% | 0% | 0% | 34.91% |
| Total | 100.00% | 100.00% | 100.00% | 100.00% | 100.00% |
| After drying MCAS to Amphoteric ratio in detergent granule | 29:1 | 4:1 | 2:1 | 29:1 | 4:1 |

Corrosion Test of Comparative example A (as above) and a Comparative example B (CAP Betaine) vs. Inventive Examples 13 and 14 (product made by the process of the present invention) have been conducted and the pitting potential at 60° C. and 90° C. are recorded to representing the corrosion profile (Table 5). The higher the pitting potential value, the lower the risk of pit formation driven by the chemical interactions of the test examples with the metal surface. Example B is Betaine solution containing 70% of CAP betaine with ??% of sodium chloride.

TABLE 5

| Corrosion Test of Example A&B vs. Inventive Example 13&14 | | Examples | | | |
|---|---|---|---|---|---|
| | | A | B | 13 | 14 |
| LC MCAS Needle paste | | 100% | 0% | 90.71% | 85.17% |
| $Na_2SO_4$ solid | | 0% | 0% | 1.59% | 3.01% |
| Betaine* | | 0% | 100% | 7.71% | 11.83% |
| Total | | 100% | 100% | 100% | 100% |
| Pitting potential(mV) | at 60° C. | 628.4 | 75.6 | 628.4 | 606.5 |
| | at 90° C. | 499.1 | 29.9 | 532.9 | 548.9 |

*CAP Betaine containing NaCl byproduct

It can be seen from Table 5 that the pitting potential of Examples 13 &14 are significantly greater than the Example B (betaine raw material containing sodium salt), indicating the corrosivity of the material is reduced at the tested level of present inventive process. The pitting potential of Inventive Examples 13 and 14 are equal/greater than Example A, indicating the corrosion profile in the present invention is comparable to current MCAS material.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of making detergent granules, wherein the detergent granules comprise: (i) an alkyl sulfate having a branched or linear unalkoxylated alkyl group comprising from 6 to 18 carbon atoms; (ii) an amphoteric surfactant; and (iii) a water-soluble inorganic salt, wherein the method comprises the steps of:

a) providing a mixture of the amphoteric surfactant and the water-soluble inorganic salt, b) preheating the alkyl sulfate to 50 to 80 degrees C., and then c) adding the mixture from the step a) into the preheated alkyl sulfate in step b) with agitation at 50 to 80 degrees C. to form a mixed paste, and d) drying the mixed paste to form the detergent granules.

2. The method of claim 1, wherein step a) further comprises premixing the water-soluble inorganic salt with the amphoteric surfactant to make the mixture.

3. The method according to claim 1, wherein the temperature of each step is from 60 to 75 degrees C.

4. The method according to claim 1, wherein the branched or linear unalkoxylated alkyl group of said alkyl sulfate comprises from 8 to 16 and wherein said alkyl sulfate is present in the amount of 60% to 95% by weight of the detergent granules.

5. The method according to claim 1, wherein the amphoteric surfactant is selected from the group consisting of betaine, sulfobetaine, amine oxide, and combinations thereof, and the amphoteric surfactant is present in an amount of from 2% to 30%, by weight of the detergent granule.

6. The method according to claim 1, wherein the amphoteric surfactant is a betaine or a sultaine selected from the group consisting of: almondamidopropyl betaine, apricotamidopropyl betaine, avocadamidopropyl betaine, babassuamidopropyl betaine, behenamidopropyl betaine, canolamidopropyl betaine, capryl/capramidopropyl betaine, cocoamidopropyl betaine, coco/oleamidopropyl betaine, coco/sunfloweramidopropyl betaine, cupuassuamidopropyl betaine, isostearamidopropyl betaine, lauramidopropyl betaine, meadowfoamamidopropyl betaine, milkamidopropyl betaine, minkamidopropyl betaine, myristamidopropyl betaine, oatamidopropyl betaine, oleamidopropyl betaine, olivamidopropyl betaine, palmamidopropyl betaine, palmitamidopropyl betaine, palm kernelamidopropyl betaine, ricinoleamidopropyl betaine, sesamidopropyl betaine, shea butteramidopropyl betaine, soyamidopropyl betaine, stearamidopropyl betaine, tallowamidopropyl betaine, undecyleneamidopropyl betaine, wheat germamidopropyl betaine, cocamidopropyl hydroxysultaine, lauramidopropyl hydroxysultaine, oleamidopropyl hydroxysultaine, tallowamidopropyl hydroxysultaine, and combinations thereof; preferably selected from the group consisting of cocoamidopropyl betaine, lauramidopropyl betaine, oleamidopropyl betaine, tallowamidopropyl betaine, cocamidopropyl hydroxysultaine, and combinations thereof; and more preferably, selected from cocoamidopropyl betaine, lauramidopropyl betaine, or a combination thereof; wherein the weight ratio of said alkyl sulfate to said betaine or sultaine is from 10:1 to 40:1.

7. The method according to claim 1, wherein the amphoteric surfactant is an amine oxide selected from the group consisting of a $C_{10-18}$ alkyl dimethyl amine oxide, a $C_{8-16}$ alkyl ethoxy dihydroxy ethyl amine oxide, a $C_{10-18}$ alkyl amidopropyl dimethyl amine oxide, and combinations thereof, preferably said amine oxide is a $C_{10-16}$ alkyl dimethyl amine oxide, $C_{12-14}$ alkyl dimethyl amine oxide, a $C_{10-16}$ alkylamidopropyl dimethyl amine oxide, or a combination thereof; and wherein the weight ratio of said AS to said amine oxide is from 2:1 to 40:1.

8. The method according to claim 1, wherein the water-soluble inorganic salt is selected from the group consisting of: sodium sulfate, sodium carbonate, magnesium chloride, magnesium sulfate, sodium silicate, and combinations thereof, and the water-soluble inorganic salt is present in the amount of from 0.5% to 20%, by weight of the detergent granule.

9. A cleaning composition comprising from 0.1% to 50%, by weight of said cleaning composition, of the detergent granule made by the method according to claim 1.

10. The cleaning composition according to claim 9, further comprising one or more surfactant selected from the group consisting of: a $C_{10}$-$C_{20}$ linear alkylbenzene sulphonate; a $C_{10}$-$C_{20}$ linear or branched alkylalkoxylated sulfate, nonionic surfactant, methyl ester sulfonate surfactant, soap, and combinations thereof.

* * * * *